US007217922B2

(12) United States Patent
Jachowski et al.

(10) Patent No.: US 7,217,922 B2
(45) Date of Patent: May 15, 2007

(54) PLANAR MICRO-MINIATURE ION TRAP DEVICES

(75) Inventors: Matthew Douglas Apau Jachowski, Stanford, CA (US); Yee Leng Low, New Providence, NJ (US); Stanley Pau, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/079,861

(22) Filed: Mar. 14, 2005

(65) Prior Publication Data

US 2006/0219888 A1 Oct. 5, 2006

(51) Int. Cl.
*B01D 59/44* (2006.01)
*H01J 49/00* (2006.01)

(52) U.S. Cl. ...................................... 250/292; 250/292

(58) Field of Classification Search ................ 250/284, 250/283, 292

See application file for complete search history.

(56) References Cited

U.S. PATENT DOCUMENTS 2,939,952 A 6/1960 Paul et al. ................. 250/41.9
3,065,640 A 11/1962 Langmuir et al. ............ 73/517
5,248,883 A * 9/1993 Brewer et al. .............. 250/292
6,469,298 B1 10/2002 Ramsey et al. ............. 250/292

OTHER PUBLICATIONS

R. E. March, "Quadrupole Ion Trap Mass Spectrometer," *Encyclopedia of Analytical Chemistry*, R. A. Meyers (Ed.), pp. 11848-11872, John Wiley & Sons, Ltd., Chichester (2000).

J. M. Wells et al., "A Quadrupole Ion Trap with Cylindrical Geometry Operated in the Mass-Selective Instability Mode," *Analytical Chem.*, vol. 70, No. 3, pp. 438-444 (Feb. 1998).

J. Chiaverini et al., "Dense Coding Demonstration and Microfabricated Ion Traps," presented at the Workshop on Trapped Ion Quantum Computing, May 13-15, 2004, University of Michigan, Ann Arbor; see the NIST Boulder website at URL www.boulder.nist.gov/timefreq/ion/tiqc1.pdf.

S. Pau et al., U.S. Appl. No. 11/048,229, filed on Feb. 1, 2005 (no copy enclosed).

C. Pai et al., U.S. Appl. No. 10/789,091, filed on Feb. 27, 2004 (no copy enclosed).

C. Pai et al., U.S. Appl. No. 10/656,432, filed on Sep. 5, 2003 (no copy enclosed).

* cited by examiner

*Primary Examiner*—Jack Berman
*Assistant Examiner*—Jennifer Yantorno

(57) ABSTRACT

A micro-miniature ion trap device comprises a wafer (or substrate) having a major surface, a multiplicity of electrodes forming a micro-miniature ion trap in a region adjacent the major surface when voltage is applied to the electrodes, characterized in that the multiplicity includes a first, planar annular electrode located over and rigidly affixed to the major surface, and at least one second, planar annular electrode located over and rigidly affixed to the major surface, the at least one second electrode being concentric with the first electrode. The at least one second electrode may be completely annular, in that the annulus forms a closed geometric shape, or it may be partially annular, in that the annulus has a slot or opening allowing access to the first electrode. In accordance with a preferred embodiment of our invention, the at least one second electrode is C-shaped, and the angle subtended by the C-shape is greater than 180 degrees.

19 Claims, 6 Drawing Sheets

PLANAR MICRO-MINIATURE ION TRAP DEVICES

BACKGROUND OF THE INVENTION

1. Field of the Invention

This invention relates to ion trap devices and, more particularly, to such devices in which the electrodes are co-planar on a suitable substrate or wafer.

2. Discussion of the Related Art

Conventional ion traps enable ionized particles to be stored and the stored ionized particles to be separated according to the ratio (M/Q) of their mass (M) to their charge (Q). Storing the ionized particles involves applying a time-varying voltage to the ion trap so that particles propagate along stable trajectories therein. Separating the ionized particles typically involves applying an additional time-varying voltage to the trap so that the stored particles are selectively ejected according to their M/Q ratios. The ability to eject particles according to their M/Q ratios enables the use of ion traps as mass spectrometers.

Exemplary ion traps are described, for example, by W. Paul et al. in U.S. Pat. No. 2,939,952 issued Jun. 7, 1960. One such ion trap, known as a quadrupole, is described by R. E. March in "Quadrupole Ion Trap Mass Spectrometer," *Encyclopedia of Analytical Chemistry*, R. A. Meyers (Ed.), pp. 11848–11872, John Wiley & Sons, Ltd., Chichester (2000). Both of these documents are incorporated herein by reference.

FIG. 1 herein shows one type of quadrupole ion trap 10 that has an axially symmetric cavity 18 akin to that depicted in FIG. 2 of March. More specifically, the ion trap 10 includes metallic top and bottom end cap electrodes 12–13 and a metallic central ring-shaped electrode 14 that is located between the end cap electrodes 12–13. Points on inner surfaces 15–17 of the electrodes 12–14 have transverse radial coordinates r and axial coordinates z. These coordinates satisfy hyperbolic equations; i.e., $r^2/r_0^2-z^2/z_0^2=+1$ for the central ring-shaped electrode 14 and $r^2/r_0^2-z^2/Z_0^2=-1$ for the end cap electrodes 12–13. Here, $2r_0$ and $2z_0$ are, respectively, the minimum transverse diameter and the minimum vertical height of the trapping cavity 18 that is formed by the inner surfaces 15–17. Typical trapping cavities 18 have a shape ratio, $r_0/z_0$, that satisfies: $(r_0/z_0)^2\approx2$, but the ratio may be smaller to compensate for the finite size of the electrodes 12–14. Typical cavities 18 have a size that is described by a value of $r_0$ in the approximate range of about 0.707 centimeters (cm) to about 1.0 cm. We refer to cavities of this approximate size as macro-cavities.

For the above-described electrode and macro-cavity shapes, electrodes 12–14 produce an electric field with a quadrupole distribution inside trapping cavity 18. One way to produce such an electric field involves grounding the end cap electrodes 12–13 and applying a radio frequency (RF) voltage to the central ring-shaped electrode 14. In an RF electric field having a quadrupole distribution, ionized particles with small M/Q ratios will propagate along stable trajectories. To store particles in the trapping cavity 18, the cavity 18 is voltage-biased as described above, and ionized particles are introduced into the trapping cavity 18 via ion generator 19.1 coupled to entrance port 19.2 in top end cap electrode 12. During the introduction of the ionized particles, the trapping cavity 18 is maintained with a low background pressure; e.g., about $10^{-3}$ Torr of helium (He) gas. Then, collisions between the background He atoms and ionized particles lower the particles' momenta, thereby enabling trapping of such particles in the central region of the trapping cavity 18.

To eject the trapped particles from the cavity 18, a small RF voltage may be applied to the bottom end cap electrode 13 while ramping the small voltage so that stored particles are ejected through exit orifice 19.4 selectively according to their M/Q ratios. Alternatively, ions can be ejected by changing the amplitude of the RF voltage applied to the ring electrode 14. As the amplitude changes, different orbits corresponding to different M/Q ratios become unstable, and ions are ejected along the z-axis. Ions can also be excited by application of DC and AC voltages to the end cap electrodes 12–13. In any case, the ejected ions are then incident on a utilization device 19.3 (e.g., an ion collector), which is coupled to orifice 19.4.

For quadrupole ion trap 10, machining techniques are available for fabricating hyperbolic-shaped electrodes 12–14 out of base pieces of metal. Unfortunately, such machining techniques are often complex and costly due to the need for the hyperbolic-shaped inner surfaces 15–17. For that reason, other types of ion traps are desirable.

A second type of ion trap 20, as shown in FIG. 2, has a trapping macro-cavity with a right circularly cylindrical shape. This trapping cavity is also formed by inner surfaces of two end cap electrodes 22–23 and a central ring-shaped electrode 24 located between, but insulated from, the end cap electrodes. Here, the end cap electrodes 22–23 have flat disk-shaped inner surfaces, and the ring-shaped electrode 24 has a circularly cylindrical inner surface. For such a trapping cavity, applying an AC voltage to the central ring-shaped electrode 24 while grounding the two end cap electrodes 22–23 will create an electric field that does not have a pure quadrupole distribution. Nevertheless, a suitable choice of the trapping cavity's height-to-diameter ratio will reduce the magnitude of higher multipole contributions to the created electric field distribution. In particular, if the height-to-diameter ratio is between about 0.83 and 1.00, the octapole contribution to the field distribution is small; e.g., this contribution vanishes if the ratio is about 0.897. For such values of this shape ratio, the effects of higher multipole distribution are often small enough so that the macro-cavity is able to trap and store ionized particles. See, for example, J. M. Ramsey et al., U.S. Pat. No. 6,469,298 issued on Nov. 22, 2002 and M. Wells et al., *Analytical Chem*., Vol. 70, No. 3, pp. 438–444 (1998), both which are incorporated herein by reference.

For this second type of ion trap, standard machining techniques are available to fabricate the electrodes 22–24 of FIG. 2 from metal base pieces, because the electrodes have simple surfaces rather than the complex hyperbolic surfaces of the electrodes 12–14 of FIG. 1. For this reason, fabrication of this second type of ion trap is usually less complex and less expensive than is fabrication of quadrupole ion traps whose electrodes have hyperbolic-shaped inner surfaces.

Nevertheless, the metallic components of such ion traps are expensive to manufacture and assemble. Moreover, these metallic components cause equipment in which they are incorporated to be large and bulky. The latter property has limited the widespread application and deployment of these ion traps in equipment such as mass spectrometers and shift registers.

More recently C. Pai et al., have described cylindrical geometry ion traps with micro-cavities formed in multi-layered semiconductor or dielectric wafers. See, for example, U.S. patent application Ser. No. 10/656,432 filed on Sep. 5, 2003 and U.S. patent application Ser. No. 10/789,091 filed on Feb. 27, 2004, both of which are assigned to the assignee hereof and incorporated herein by reference. In the designs of Pai et al. the metal electrodes are stacked and separated from one another by insulating, dielectric layers. A significant number of layers, and hence relatively complex processing is utilized, which increases production cost.

Thus, a need remains in the art for a micro-miniature ion trap that can be inexpensively and readily implemented on a suitable substrate, such as semiconductor or dielectric substrate. In particular, there is a need for such an ion trap that has a micro-cavity that can be readily and inexpensively fabricated without the need for complex, multi-layered structures.

BRIEF SUMMARY OF THE INVENTION

In accordance with one aspect of our invention, a micro-miniature ion trap device comprises a wafer (or substrate) having a major surface, a multiplicity of electrodes forming a micro-miniature ion trap in a region adjacent the major surface when voltage is applied to the electrodes, characterized in that the multiplicity includes a first, planar annular electrode located over and rigidly affixed to the major surface, and at least one second, planar annular electrode located over and rigidly affixed to the major surface, the at least one second electrode being concentric with the first electrode. The at least one second electrode may be completely annular, in that the annulus forms a closed geometric shape, or it may be partially annular, in that it does not form a closed geometric shape; that is, the annulus has a slot or opening allowing access to the first electrode.

In accordance with a preferred embodiment of our invention, the at least one second electrode is C-shaped, and the angle subtended by the C-shape is greater than 180 degrees.

BRIEF DESCRIPTION OF THE SEVERAL VIEWS OF THE DRAWING

Our invention, together with its various features and advantages, can be readily understood from the following more detailed description taken in conjunction with the accompanying drawing, in which.

DETAILED DESCRIPTION OF THE INVENTION

Figure 1:
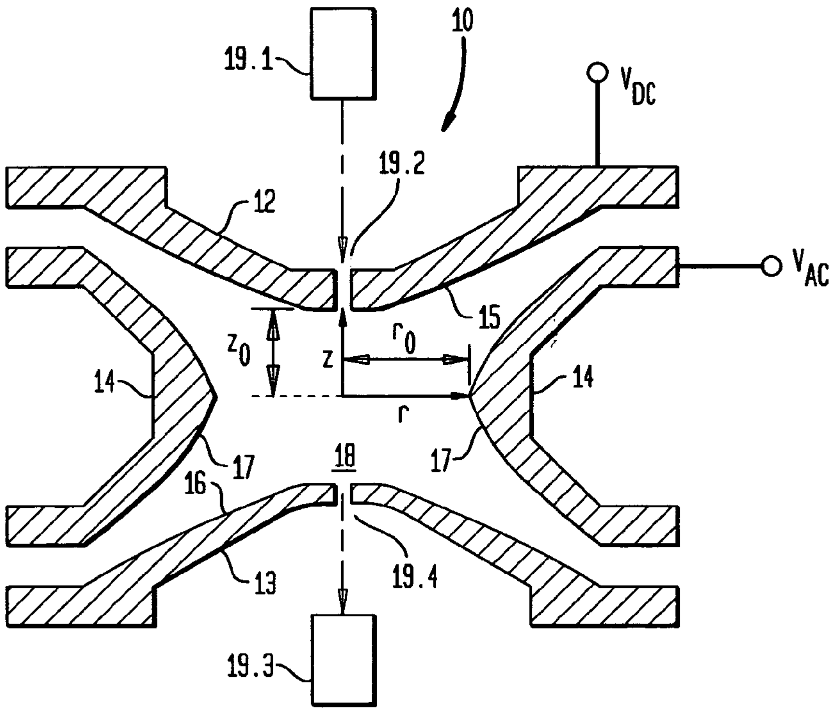
FIG. 1 (PRIOR ART)
FIG. 1 is a schematic, cross sectional view of a prior art ion trap having a hyperbolic macro-cavity.
Figure 2:
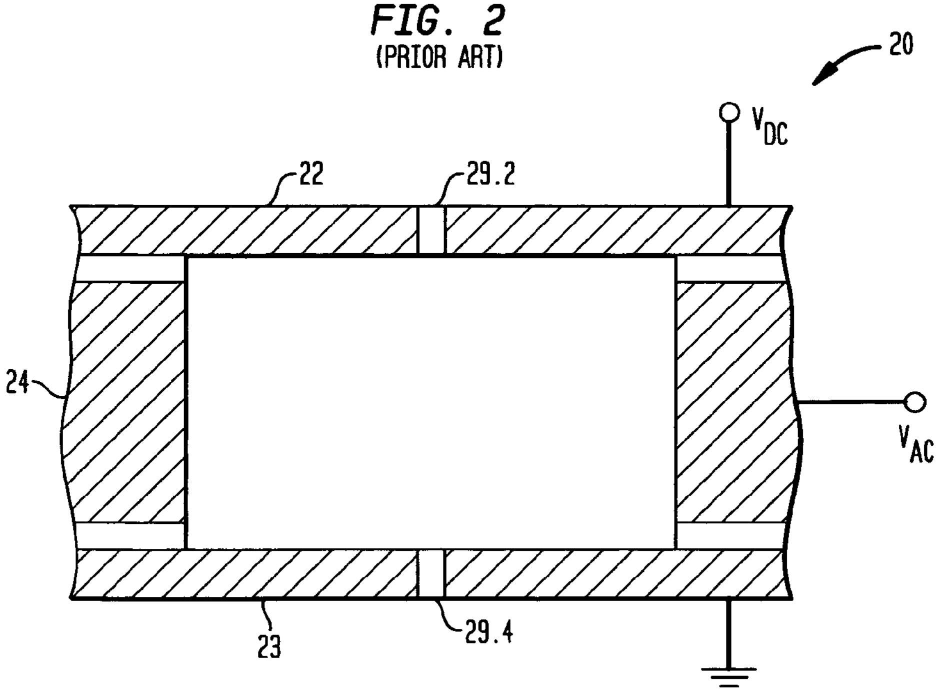
FIG. 2 (PRIOR ART)
FIG. 2 is a schematic, cross sectional view of a prior art ion trap having a cylindrical macro-cavity.
Figure 3:
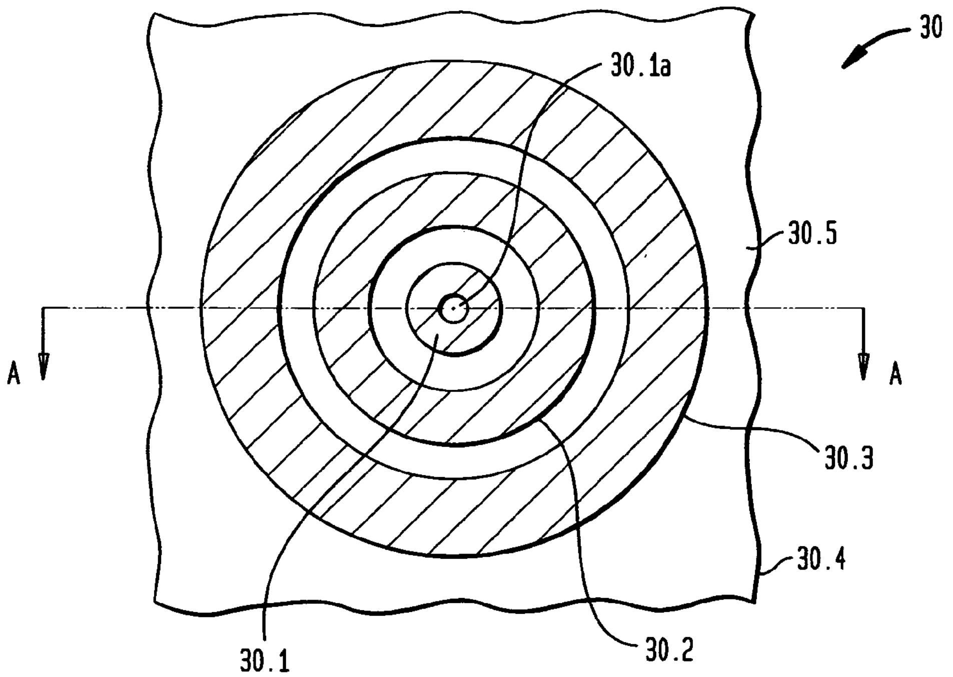
FIG. 3 is a schematic, top view of a micro-miniature ion trap device in accordance with one embodiment of our invention in which three concentric electrodes are completely annular.
Figure 3A:
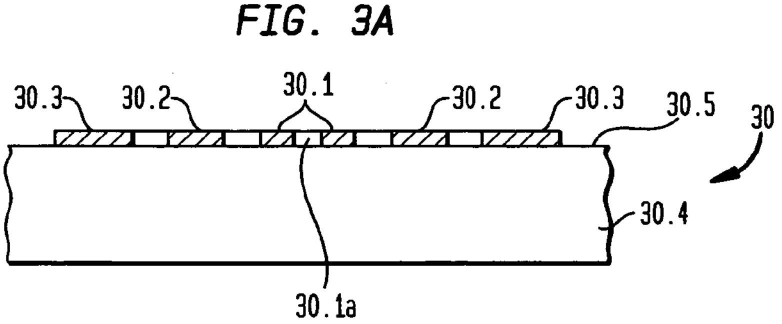
FIG. 3A is a schematic, cross-sectional view of the device of FIG. 3 taken along line A—A.
Figure 4:
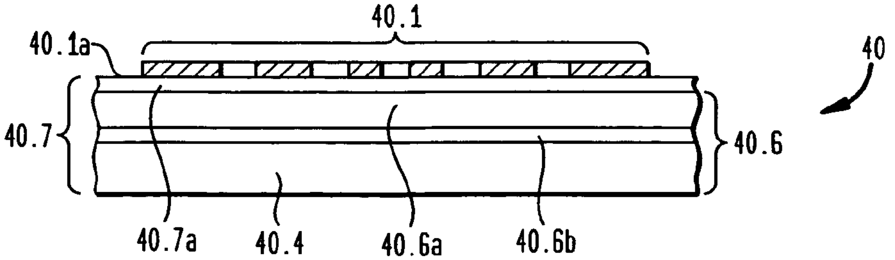
FIG. 4 is a schematic, cross-sectional view of a portion of the device of FIG. 3 modified to include a Faraday detector, in accordance with another embodiment of our invention.

With reference now to FIGS. 3–3A, we show a micro-miniature ion trap device 30 comprising a substrate (or wafer) 30.4 having a major surface 30.5, a first, planar, annular electrode 30.1 located over and rigidly affixed to the surface 30.5, and at least one second, planar, annular electrode 30.2 located over and rigidly affixed to the surface 30.5. The at least one second electrode is concentric with the first electrode. More than two second electrodes can be utilized. For example, in the embodiment shown in FIGS. 3–6 another planar, annular second electrode 30.3 surrounds the electrode 30.2 and is also located over and rigidly affixed to the surface 30.5. In contrast, embodiments utilizing only one second electrode are shown in FIGS. 7–12.

The substrate or wafer 30.4 may comprise a semiconductor or dielectric material. Illustrative semiconductor materials include silicon-based semiconductors (e.g., Si or SiC) and Group III-V compound semiconductors (e.g., InP or GaAs). Illustrative dielectric materials include ceramics (e.g., alumina) and glasses (e.g., pyrex or quartz). In addition, substrates that are a combination of such materials are also suitable (e.g., SOI substrates known as silicon-on-insulator wafers).

In those embodiments having a multiplicity (n>1) of annular, circular electrodes (e.g., 30.1, 30.2, 30.3), the radial width $w_n$ of the $n^{th}$ second electrode is given approximately by $w_n = n w_{n-1}$. For example, the width of the electrode 30.2 is twice that of electrode 30.1, and the width of electrode 30.3 is three times that of electrode 30.2. In addition, given that the innermost, first electrode 30.1 has an inside radius $r_1$, the electrodes are separated from one another by a constant gap distance g, and the electrodes are separated from the substrate by a distance d; then we prefer that $r_1 < d$ and $g \leqq r_1$.

Figure 7:
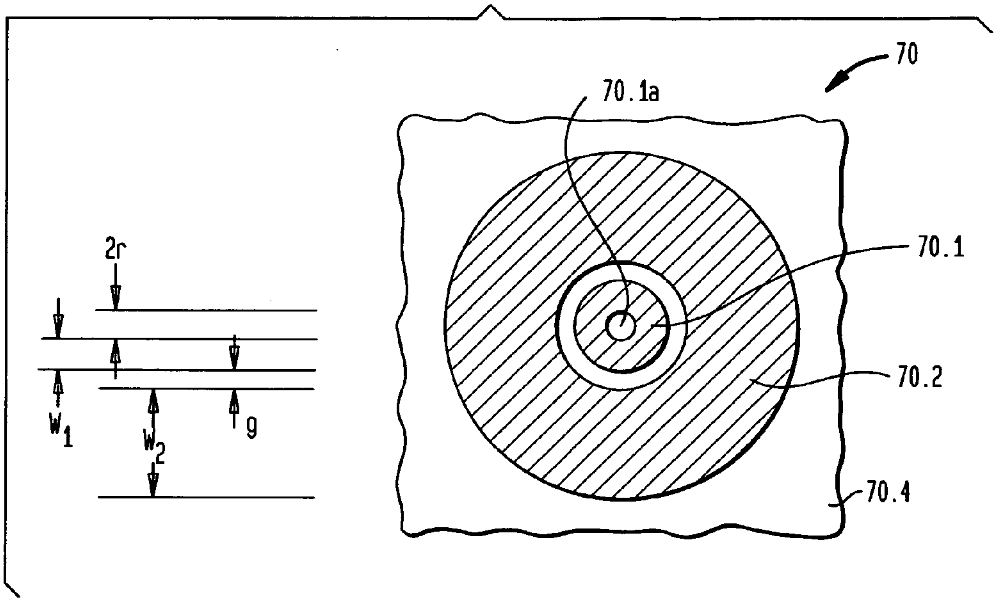
FIG. 7 is a schematic, top view of a micro-miniature ion trap device in accordance with one embodiment of our invention in which two concentric electrodes are completely annular.

In any case, however, the first and second electrodes may be completely annular in that the annulus of each electrode forms a closed geometric figure, as shown, for example, in FIGS. 3 and 7; or the first electrode may be completely annular, but the second electrode only partially annular, in that it does not form a closed geometric shape; that is, the annulus of the second electrode has a slot or opening allowing electrical access to the first electrode, as shown, for example, in FIGS. 9–12 and described hereinafter.

Figure 5:
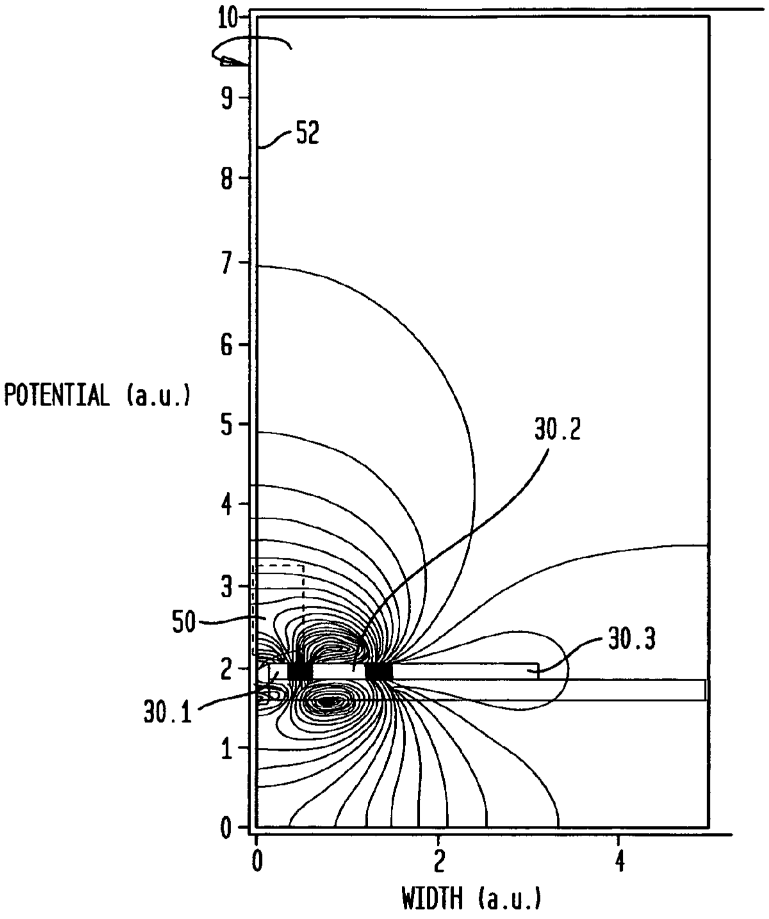
FIG. 5 is a graph showing the calculated potential of a three-electrode structure of the type depicted in FIG. 3.

To describe the operation of the embodiment of FIG. 3 we turn now to FIG. 5, which shows a graph of the electric field lines and potential that are created when a DC voltage (or ground) is applied to the first electrode 30.1, a suitable AC voltage, well known in the art, is applied to the second electrode 30.2, and a DC voltage (or ground) is applied to second electrode 30.3. (Note, the potential and field lines are shown in only one plane inasmuch as the device exhibits symmetry about an axis of rotation 52, which extends through the common center of the concentric electrodes.) Notwithstanding that all of the first and second electrodes are coplanar (rather than stacked, as in the prior art), we were surprised to find that our model was still able to simulate an ion trapping region 50. More specifically, the applied voltage generates an essentially quadrupole potential in the region 50, which lies just above the top surface of the first electrode 30.1. Region 50 effectively traps ions injected into the device 30.

In order to eject trapped ions from the region 50 a DC voltage is applied to the first electrode 30.1. These ejected ions are collected by a suitable detector. For example, in FIG. 4 we illustrate a micro-miniature ion trap device 40, which includes a multiplicity of electrodes formed on top of a multi-layered structure 40.7 including a Faraday detector 40.6 disposed on top of a suitable substrate or wafer 40.4. The detector 40.6 is basically a capacitor formed by a pair of conductors (e.g., an aluminum layer 40.6*a* and substrate 40.4) that sandwich an electrically insulating layer (e.g., oxide layer 40.6*b*). Ions are able to access the detector by passing through a hole or aperture 40.1*a* in the first annular electrode 40.1 (aperture 30.1*a* in electrode 30.1 of FIG. 3). The electrodes themselves are illustratively formed on an electrically insulating layer (e.g., oxide layer 40.7*a*). Note, we show here a single ion trap device 40 and a single Faraday detector 40.6. In the case of an array of such devices, an array of individual detectors may be employed, or a single, broad area detector (similar to detector 40.6) may be extended under the electrodes of all of the devices.

The previous embodiments illustrate ion trap designs that incorporate three completely annular electrodes. However, those skilled in the art will readily appreciate that more than three such electrodes can be utilized, for example, to shape the electric field distribution so that it is more nearly an ideal quadrupole in the ion trap region (e.g., region 50 of FIG. 5). On the other hand, our simulations surprisingly indicate that fewer than three (two in particular) electrodes can be also be utilized, which simplifies fabrication while still generating the requisite quadrupole potential, as discussed below in conjunction with FIGS. 7–8.

Figure 8:
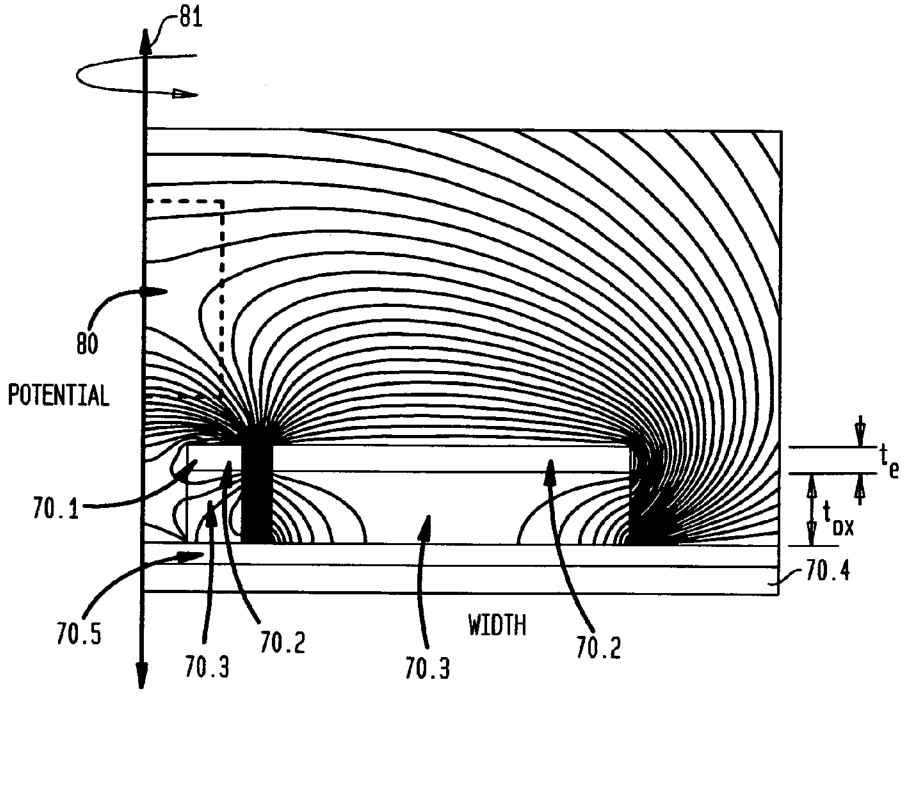
FIG. 8 is a graph showing the calculated potential of a two-electrode structure of the type depicted in FIG. 7.
Figure 9:
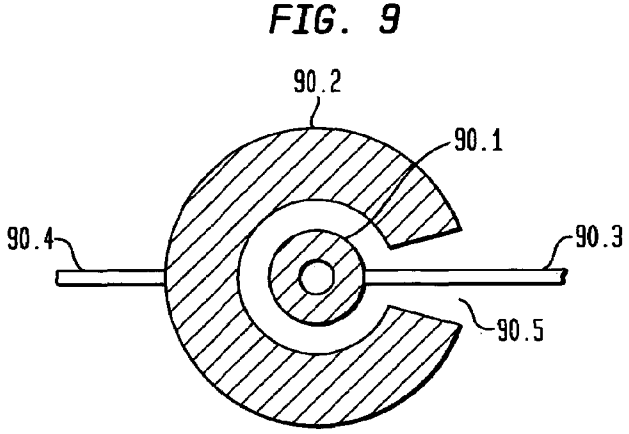
FIG. 9 is a schematic, top view of a micro-miniature ion trap electrode structure in which the first electrode is completely annular and circular, whereas the second electrode has a partially annular, C-shaped configuration, which is also circular, in accordance with another embodiment of our invention.
Figure 10:
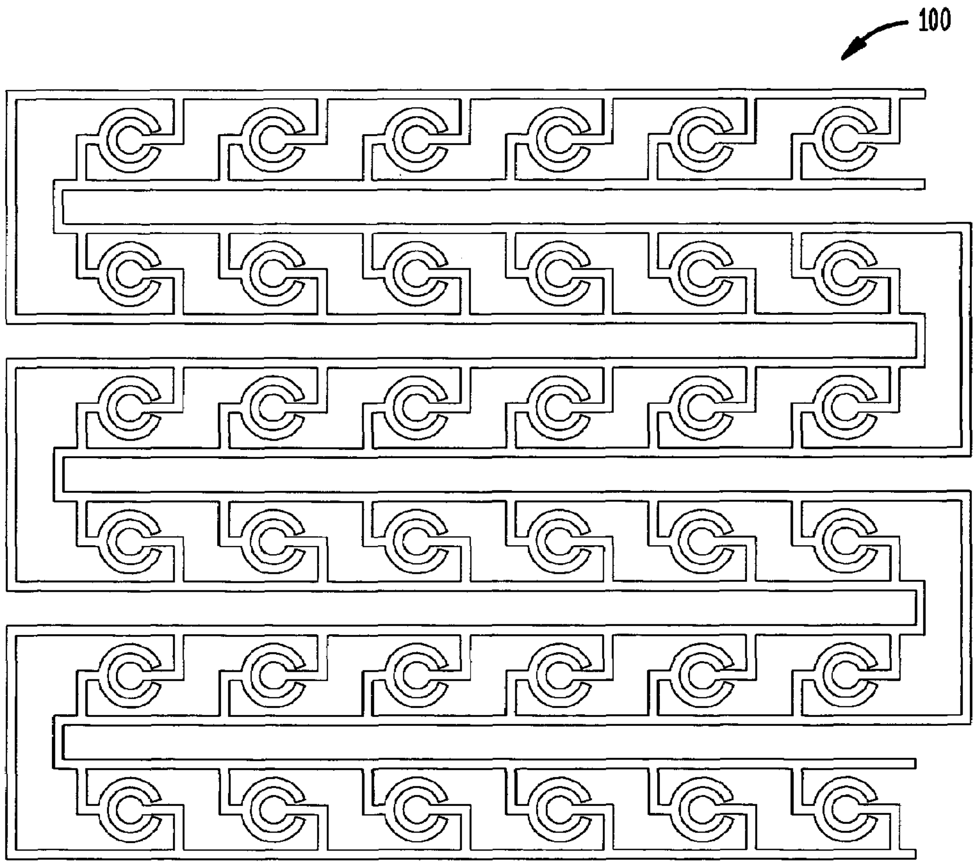
FIG. 10 is a schematic, top view of an array of micro-miniature ion trap devices of the type shown in FIG. 9, in accordance with still another embodiment of our invention.

More specifically, FIG. 7 shows a schematic top view of a planar micro-miniature ion trap device 70, which employs only two completely annular, concentric, circular electrodes 70.1 and 70.2 formed on a suitable substrate or wafer 70.4, in accordance with an illustrative embodiment of our invention. FIG. 8, which is a schematic side view of a single half-plane of rotation (around axis 81) of device 70, shows that (1) a metallic ground plane 70.5 formed on substrate 70.4 also serves as a third electrode of the device; (2) the top surfaces of electrodes 70.1 and 70.2 are coplanar; and (3) each electrode 70.1, 70.2 is formed on a patterned oxide layer 70.3 disposed on ground plane 70.5. Computer simulations were used to generate the electric field lines of FIG. 8. The calculated field distribution indicates that this two-annular-electrode design is sufficient to generate a quadrupole potential within the ion trap region 80 just above the inner electrode 70.1.

Our analysis of this embodiment involved calculations based on several parameters: the radius r of the opening or hole 70.1 a of the inner electrode 70.1, the width $w_1$ of the inner electrode 70.1, the gap g between the inner electrode 70.1 and the outer electrode 70.2, the width $w_2$ of the outer electrode 70.2, the thickness $t_{ox}$ of the oxide layers 70.3, and the thickness $t_e$ of the electrodes 70.1, 70.2. Our approach was to search an n-dimensional space to vary every parameter of interest, with the object being to enhance the relative quadrupole coefficient ($A_q$) of the electric field distribution and at the same time to diminish the octapole and hexapole coefficients ($A_o$ and $A_h$, respectively) relative to the quadrupole coefficient ($A_q$); i.e., to make the ratios $A_o/A_q$ and $A_h/A_q$ as near to zero as possible. For example, we found that the ratio $A_o/A_q$ was minimized at a value of about +0.05 for $w_1$=0.70, $w_2$=any value, g=0.35, r=0.65–0.70, $t_e$=0.3 and $t_{ox}$=1.0, where the dimensions are given in arbitrary units. However, with this set of parameters the relative hexapole coefficient was still significant; i.e., $A_h/A_q$=−0.50.

In order to further reduce the hexapole contribution, as well as the octapole contribution, we found that the device parameters should satisfy the following: $w_1$=1.2, $w_2$=any value, g=0.8, r=1.6, $t_e$=0.35 and $t_{ox}$=1.0.

Figure 6:
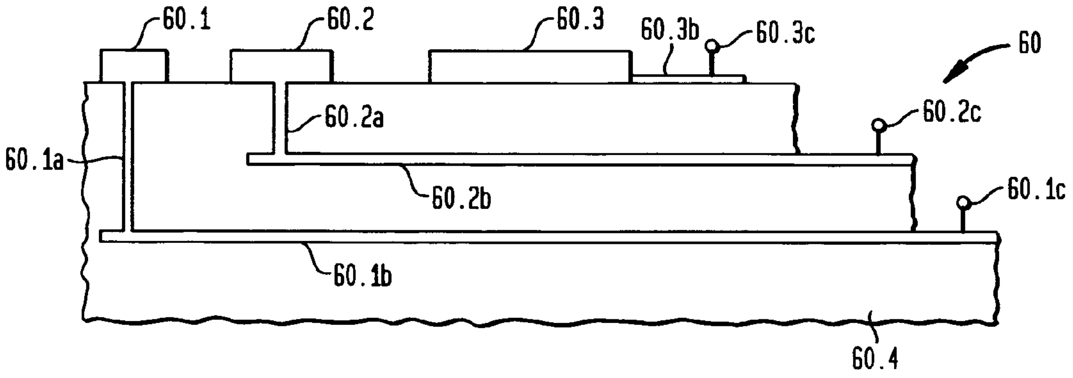
FIG. 6 is schematic, side view of a portion of a micro-miniature ion trap device showing how vias are used to gain electrical access to the completely annular electrodes of the type shown in FIG. 3, for example, in accordance with yet another embodiment of our invention.

Regardless of the number of electrodes employed, provision must be made in our planar, micro-miniature ion trap devices for applying suitable AC and/or DC signals to particular ones of the individual electrodes. We describe two different approaches: FIG. 6 illustrates the use of vias, which is particularly suited for designs that include completely annular outer electrodes, whereas FIGS. 9–12 illustrate the use of a C-shaped, partially annular outer electrode, which obviates the need for vias in two-annular-electrode designs.

In the embodiment of FIG. 6 we show a side, half-view of a planar, micro-miniature ion trap device 60 comprising a multiplicity of three completely annular, concentric electrodes: an innermost electrode 60.1, an outermost electrode 60.3, and a middle electrode 60.2 disposed between the innermost and outermost electrodes. All of the electrodes are formed over and rigidly affixed to a substrate or wafer 60.4. Electrical contact to the outermost electrode 60.3 is simplest; it entails applying a suitable voltage to a terminal 60.3*c* on conductor 60.3*b*, which makes physical contact with electrode 60.3 along a portion of at least its outer periphery. However, electrical contact to the middle and innermost electrodes 60.2 and 60.1, respectively, is slightly more complicated, but well known in the integrated circuit art: it entails formation of conducting vias 60.2*a* and 60.1*a*, respectively, to buried conductors 60.2*b* and 60.1*b*, respectively. Terminals 60.2*c* and 60.1*c* on exposed portions of the buried conductors 60.2*b* and 60.1*b*, respectively, allow suitable voltages to be applied to the middle and innermost electrodes, or allow the innermost electrode to be grounded.

The embodiment of FIG. 6 can readily be extended to ion trap devices that have only two annular electrodes or to such devices having more than three annular electrodes. However, in the case of two electrodes, we prefer embodiments that do not require the use of vias and the attendant increased fabrication complexity. In particular, we show two-electrode, concentric designs in FIGS. 9–12 in which the inner electrode is still completely annular but the outer electrode is partially annular (e.g., C-shaped). (For simplicity the substrate, wafer and any other supporting layers lying beneath the electrodes have been omitted.) More specifically, in FIG. 9 the inner electrode 90.1 is completely annular and circular, whereas outer electrode 90.2 is C-shaped and circular. Thus, the C-shaped electrode 90.2 has an opening 90.5 that allows conductor 90.3 to make electrical contact with the inner electrode 90.1. Contact to the outer electrode 90.2 is simply made by means of conductor 90.4, where the two conductors 90.3, 90.4 typically lie on the top surface of the device.

In general, the angle subtended by the C-shape should be greater than 180 degrees and not so large that the requisite quadrupole potential for ion trapping cannot be attained. Put another way, the opening should be made as small as possible so that, on the one hand, a conductor (e.g., 90.3, 110.3, 120.3) can still reach the inner electrode (90.1, 110.1, 120.1) without shorting against the edges of the outer electrode (90.2, 110.2, 120.2) at the mouth of the opening and, on the other hand, should allow the requisite quadrupole potential for ion trapping to be attained.

Figure 11:
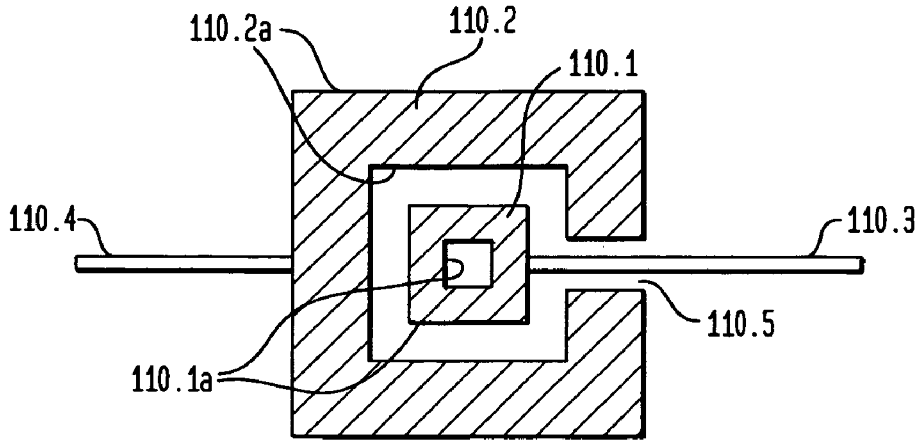
FIG. 11 is a schematic, top view of a micro-miniature ion trap electrode structure in which the first electrode is completely annular and square, whereas the second electrode has a partially annular, C-shaped configuration, which is also square, in accordance with another embodiment of our invention.
Figure 12:
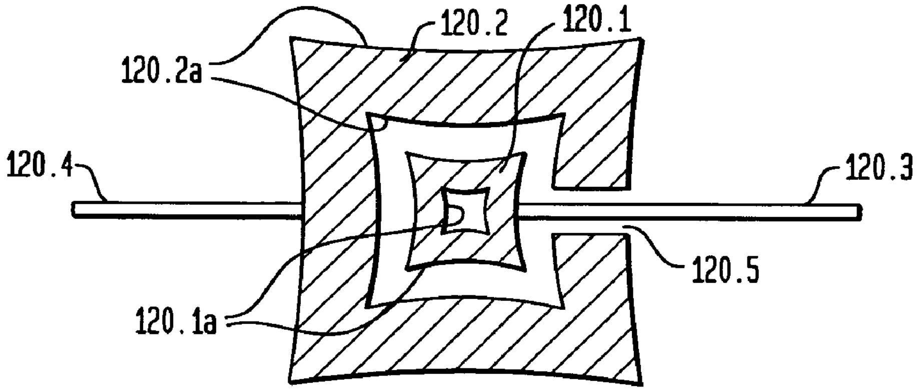
FIG. 12 is a schematic, top view of a micro-miniature ion trap electrode structure in which the first electrode is completely annular and hyperbolic, whereas the second electrode has a partially annular, C-shaped configuration, which is also hyperbolic, in accordance with another embodiment of our invention.

The boundaries or peripheries of the annular electrodes need not be circular, however; they could be linear as shown in FIG. 11; that is, linear edges 110.1*a*, 110.2*a* form connected rectangular segments, which in turn form concentric, square inner and outer electrodes 110.1 and 110.2. Alternatively, the boundaries or peripheries of the annular electrodes could be curved as shown in FIG. 12; that is, for example, hyperbolic edges 120.1*a*, 120.2*a* form connected hyperbolic segments, which in turn form concentric, hyperbolic inner and outer electrodes 120.1 and 120.2. Those skilled in the art will readily recognize that other types of curved edges and other geometric shapes can be utilized in the design of the electrodes of our ion trap devices.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention. In particular, a multiplicity of our ion trap devices can be readily arranged in the form of an array. We illustrate in FIG. 10 one such array 100 using the two-electrode ion trap design of FIG. 9, which facilitates making electrical contact to all of the devices. As noted earlier in the discussion of FIG. 4, an array of detectors (not shown) may be coupled to the array of ion trap devices (e.g., each detector coupled to at least one ion trap device), or a single broad area detector may be coupled to the entire array of ion trap devices.

We claim:

1. A micro-miniature ion trap device comprising:

a substrate having a major surface, a multiplicity of electrodes forming a micro-miniature ion trap in a region adjacent said surface when voltage is applied to said electrodes, characterized in that said multiplicity includes a first, planar annular electrode located over and rigidly affixed to said surface, and at least one second, planar annular electrode located over and rigidly affixed to said surface, said at least one second electrode being concentric with said first electrode, wherein said at least one second electrode is partially annular.

2. The device of claim 1, wherein said second electrode is C-shaped and the angle subtended by said C-shaped electrode is greater than 180 degrees.

3. The device of claim 2, wherein said first and second electrodes are circular structures.

4. The device of claim 3, further including a multiplicity of n first and second electrodes, and wherein the width $w_n$ of the $n^{th}$ second electrode is given approximately by $w_n = nw_{n-1}$.

5. The device of claim 2, said first and second electrodes are non-circular structures including a plurality of connected segments that partially surround said first electrode.

6. The device of claim 5, wherein said segments are rectangular.

7. The device of claim 5, wherein said segments have curved edges.

8. The device of claim 7, wherein said curved edges are hyperbolic.

9. The device of claim 1, wherein said electrodes are configured to produce a substantially quadrupole electric field in said ion trap region in response to said voltage.

10. The device of claim 1, wherein said first and second electrodes are configured to have top surfaces that are coplanar with one another.

11. The device of claim 1, wherein said electrodes have a common center, and further including an ion detector located along an axis that extends through said center, said detector being configured to receive ions released from said ion trap.

12. A micro-miniature ion trap device comprising:

a substrate having a major surface, a multiplicity of electrodes forming a micro-miniature ion trap in a region adjacent said surface when voltage is applied to said electrodes, characterized in that said multiplicity includes a first, planar annular electrode located over and rigidly affixed to said surface, and at least one second, planar annular electrode located over and rigidly affixed to said surface, said at least one second electrode being concentric with said first electrode, wherein said first and second electrodes are completely annular, wherein said first and second electrodes are circular structures, and further including a multiplicity of n first and second electrodes, and wherein the width $w_n$ of the $n^{th}$ second electrode is given approximately by $w_n = nw_{n-1}$.

13. A micro-miniature ion trap device comprising:

a substrate having a major surface, a multiplicity of electrodes forming a micro-miniature ion trap in a region adjacent said surface when voltage is applied to said electrodes, characterized in that said multiplicity includes a first, planar annular electrode located over and rigidly affixed to said surface, and at least one second, planar annular electrode located over and rigidly affixed to said surface, said at least one second electrode being concentric with said first electrode, wherein said first and second electrodes are completely annular, and said first and second electrodes are non-circular structures including a plurality of connected segments that completely surround said first electrode.

14. The device of claim 13, wherein said segments are selected from the group consisting of shapes that are rectangular, shapes that have curved edges, and shapes that have hyperbolic edges.

15. A micro-miniature ion trap device comprising:

a substrate having a major surface, a multiplicity of electrodes forming a micro-miniature ion trap in a region adjacent said surface when voltage is applied to said electrodes, characterized in that said multiplicity includes a first, planar annular electrode located over and rigidly affixed to said surface, and at least one second, planar annular electrode located over and rigidly affixed to said surface, said at least one second electrode being concentric with said first electrode, wherein said substrate is conductive, said first electrode is circular having an inner radius r, and said electrodes are separated from said substrate by a distance d>r.

16. The device of claim 15, wherein said first and second electrodes circular and are separated by a gap having a width g≦r.

17. The device of claim 15, wherein said electrodes are configured to produce a substantially quadrupole electric field in said ion trap region in response to said voltage.

18. The device of claim 15, wherein said first and second electrodes are configured to have top surfaces that are coplanar with one another.

19. The device of claim 15, wherein said electrodes have a common center, and further including an ion detector located along an axis that extends through said center, said detector being configured to receive ions released from said ion trap.

* * * * *